Dec. 9, 1924.
E. M. STORY
HOLDER FOR SHOW CARDS, ETC
Filed July 31, 1923
1,518,943
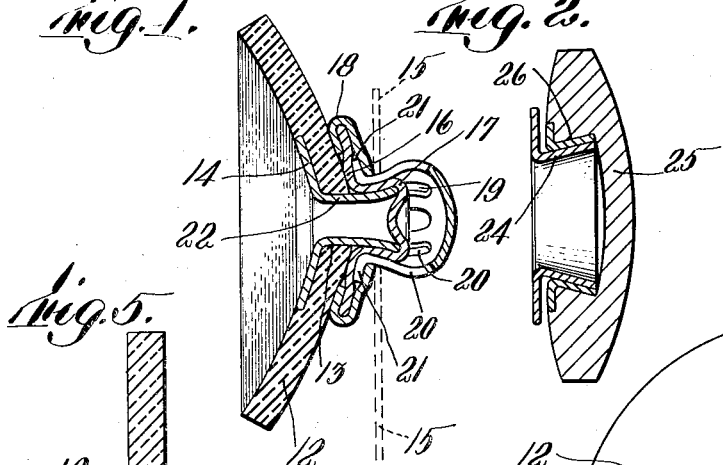
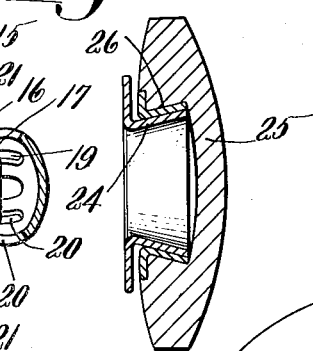
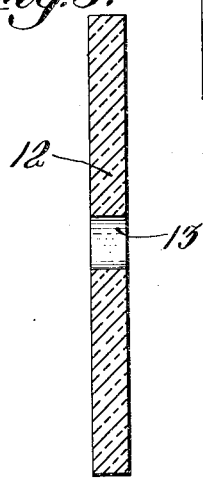
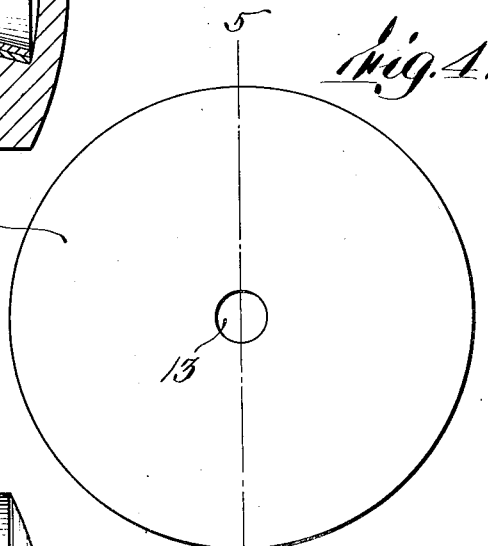
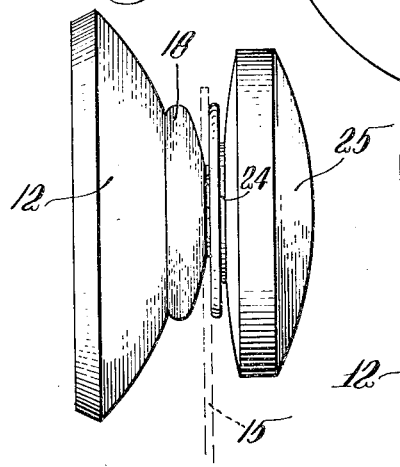
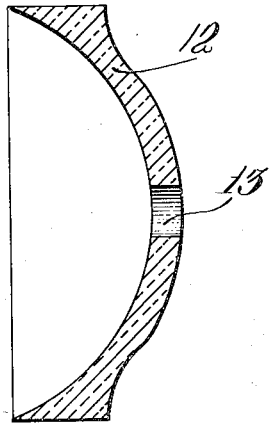
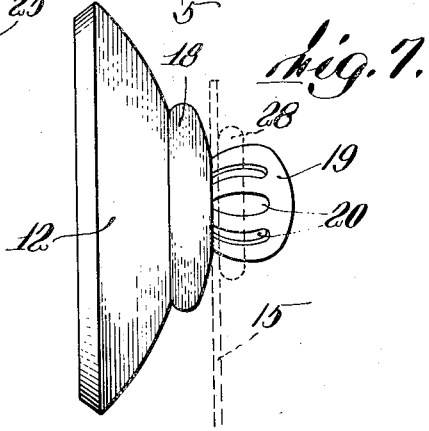
Inventor:
Elliott M. Story Patented Dec. 9, 1924.

UNITED STATES PATENT OFFICE.

ELLIOTT M. STORY, OF WORCESTER, MASSACHUSETTS.

HOLDER FOR SHOW CARDS, ETC.

Application filed July 31, 1923. Serial No. 654,876.

*To all whom it may concern:*

Be it known that I, ELLIOTT M. STORY, a citizen of the United States, residing at Worcester, in the county of Worcester and State of Massachusetts, have invented new and useful Improvements in Holders for Show Cards, Etc., of which the following is a specification.

This invention relates to a holder adapted to support an article, such as a show card, beside a vertical supporting body, such as a pane of glass in a show window, the holder including an elastic rubber cup adapted to be held by atmospheric pressure in contact with the supporting body, and article-engaging means projecting from said cup.

The object of the invention is to provide a simple and efficient holder of this character, of relatively inexpensive construction, and utilizing as a component part thereof the stud member of an ordinary stud-and-socket or snap fastener.

Of the accompanying drawings forming a part of this specification—

Figure 1 is a sectional view, showing on an enlarged scale, a holder embodying the invention.

Figure 2 is a sectional view of a socket member complemental to the stud member shown by Figure 1.

Figure 3 is an edge view, showing the cup, the stud member, and the socket member shown by Figures 1 and 2, said parts being assembled.

Figure 4 is a side view of the cup shown by Figures 1 and 3, as it appears before it is assembled with the stud member.

Figure 5 is a section on line 5—5 of Figure 4.

Figure 6 is a sectional view showing the cup molded before the application of the stud member thereto.

Figure 7 shows the cup and the stud member in elevation, and shows by dotted lines a ring substituted for the socket member.

The same reference characters indicate the same parts in all the figures.

In the drawings 12 represents an elastic rubber cup, having a concave inner side, a substantially circular margin and a central orifice 13.

To the central portion of the cup is fixed the stud member of a stud-and-socket or snap fastener of well known construction. The stud member extends through the orifice 13 and has an inner annular clamping flange 14, seated on the concave side of the cup, an outer annular clamping flange seated on the outer side of the cup, and a head projecting from the outer side of the cup and adapted to enter an orifice in a show card 15, or other article supported by the holder. In this instance, the outer flange is of composite construction and includes an inner annular portion 16, formed on a hollow boss 17, and an outer annular portion 18, embracing the margin of the portion 16. The head is a hollow boss 19, provided with slots 20, forming flexible tongues, the end portions 21 of which are interposed between the flange portions 16 and 18. The inner flange 14 is formed on a tube 22, which is inserted and expanded in the boss 17, to interlock it with the boss, the latter being of tapering form. The inner portion of the head 19 is contracted, and also interlocked with the boss 17.

The stud member construction above described, is well known in snap fasteners, and although I have described the same somewhat minutely, I do not limit myself to this construction, and may employ any stud member including an annular inner flange seated on the concave side of the cup, an annular outer flange seated on the outer side of the cup, and a head projecting from the outer side of the cup, and adapted to support an article 15, the construction being such that the stud member is adapted to be engaged with the cup by the operation of assembling its parts in a well known manner.

The assembling operation causes the inner and outer clamping flanges to exert compressive pressure on a central zone of the cup 12, so that an air-tight joint is formed between the cup and the stud member, the construction of the latter being such that air cannot pass through it. The cup is therefore adapted to be secured by atmospheric pressure to a smooth flat surface, such as that of a pane of glass, by pressing the margin of the cup against said surface until the major portion of the air in the cup is expelled.

An article 15 may now be suspended from the head beside the supporting surface. The form of the head is such that the article 15 hangs thereon, as shown by Figure 1, without liability to slip toward the outer end of the head. The article may, however, be more positively confined against outward movement on the head by a socket member complemental to the stud member, and adapted to separably engage the head of the latter. In this instance the head is rendered elastic by the slots 20, and the socket member is of a well known type and includes an annular tapered socket portion 24, inserted in a bushing 26, engaged with a cap 25, the socket member being adapted to separably engage the head.

It is obvious that the socket portion 24 may be elastic, and the head 19 inelastic, as in other well known forms of snap fasteners.

The socket member may be an elastic band or ring 28, shown by dotted lines in Figure 7, adapted to contract upon the inner portion of the head.

The inner and outer clamping flanges of the stud member may be cupped or dished as shown by Figure 1, and the cup 12 may be normally flat, as shown by Figures 4 and 5. The operation of clamping the central zone of the disk between the cupped flanges results in the formation of a concavo-convex cup. The holder, therefore, may be economically made by cutting a flat disk from sheet rubber and engaging therewith a stud member, which is readily obtainable in the open market, and requires no adaptation, other than the cupping or dishing of the clamping flanges, no molds being required to form the cup. If desired, however, the cup may be molded in substantially the form shown by Figure 6, in which case the cupping of the clamping flanges is not essential.

It will be seen that the described holder includes two general elements, one of which is a snap-fastener of the well known stud-and-socket type, while the other is a carrying member 12, composed of an elastic rubber cup, adapted to be held by atmospheric pressure against a support. The operation of securing the stud member of the snap-fastener to the carrying member 12, is the same as that of securing said stud member to a carrying member forming a portion of a garment. This operation is quickly performed by simultaneously interengaging the parts of the stud member with each other and causing the flanges 14 and 16 to clamp the central zone of the cup or carrying member 12. When the stud member is horizontally supported by the carrying member, its outer portion is adapted to support an article 15 depending therefrom, and the socket member of the fastener is then applied and releasably confines the article on the stud member. The yielding engagement of the socket member with the stud member permits quick application and removal of the socket member without the use of a tool.

I claim:

A holder of the character stated, comprising a carrying member composed of an elastic rubber cup, adapted to be held by atmospheric pressure against a support; and a snap-fastener of the stud-and-socket type, the stud member whereof includes interengaged parts provided with clamping flanges which are caused by the interengagement of said parts to engage a central zone of said cup, so that a portion of the stud member projects outward from the back of the cup, said portion being formed to support an article depending therefrom, in position to be laterally confined by the socket member of said fastener, so that the fastener, when supported by the cup, is adapted to releasably confine an article suspended therefrom.

In testimony whereof I have affixed my signature.

ELLIOTT M. STORY.